Dec. 25, 1962 C. F. WEISS, JR., ET AL 3,070,780

MASTER TIMER

Filed July 13, 1959 2 Sheets-Sheet 1

INVENTORS
CORNELIUS F. WEISS JR.
ALLEN B. BENSON

BY Carl C. Kling

ATTORNEY

Dec. 25, 1962 C. F. WEISS, JR., ET AL 3,070,780

MASTER TIMER

Filed July 13, 1959 2 Sheets-Sheet 2

INVENTORS
CORNELIUS F. WEISS JR.
ALLEN B. BENSON
BY Carl C. Kling
ATTORNEY

United States Patent Office 3,070,780
Patented Dec. 25, 1962

3,070,780

MASTER TIMER

Cornelius F. Weiss, Jr., Beacon, and Allen B. Benson, Poughkeepsie, N.Y., assignors to International Business Machines Corporation, New York, N.Y., a corporation of New York Filed July 13, 1959, Ser. No. 826,531
8 Claims. (Cl. 340—172.5)

This invention relates to coded record data processing, and particularly to a circuit for providing master timings to control the processing of coded characters read from the record.

In modern computer applications, paper tapes are frequently used as inputs for the vast quantities of precise data demanded. Efficiency and economy of computer time require that the input tapes be scanned as rapidly as possible; speeds of 100 inches per second and upward are becoming common. When the desired number of characters has been read from tape, it is desired to stop the tape before the succeeding character on tape coasts past the reading station; for otherwise the succeeding character may pass without being read, in which case it is irretrievably lost. The supply and takeup reels, the drive motors and shafts, and even the tape itself build up inertia at the speeds called for which make such sudden stopping very difficult. Precisely machined drives and expensive electromagnetic brakes are generally used to effect the required sudden stopping of the tape; even these, however, cannot always be depended upon to stop the tape on the same character as that in which the stop signal arrives. In the prior art, where high speed reading and sudden stops were attempted, it was not unusual for a portion of tape containing a character to coast unread past the read station as the tape decelerated after the stop command. The data upon this portion of tape which coasted past the read station during the deceleration after the Stop signal, upon the later restarting of the tape drive, was generally lost.

The mechanical precision required to decelerate tape moving at high speeds, in the space between succeeding characters, becomes prohibitively expensive if not impossible as speeds are increased. It is desired, therefore, to provide means to read and retain a character whenever the tape area upon which that character is recorded coasts past the read station during a deceleration operation, and gate the character forward for further processing as the tape drive is started by the next Go signal. Such means makes it no longer necessary to stop the tape between characters, thereby increasing the speed at which a given tape drive can operate without danger of losing a character during a stop operation. Where high speed is not necessary, such means makes unnecessary the use of high speed brakes and of precision machining of the tape drive, which allows the use of cheaper tape drives.

Paper tapes are generally used because of their economy and convenience in handling. The tape may be processed many times, by low speed or high speed readers, and may be stored indefinitely. It may be mailed or shipped to remote locations, or may be read at one location and the data transmitted over telephone or telegraph lines to a reperforator station, where the sending tape is duplicated. Since one of the principal advantages of coded paper tape over other storage media is economy, it is generally prepared on inexpensive punches which do not always generate precisely punched characters in perfect registration. Since the tape may be handled several times, fed through mechanical readers, mailed or shipped to remote locations, or stored, it is subject to folding, tearing and dimensional changes due to humidity or stretching strains introduced by the handling machines.

There are several variations of paper tape recording patterns, generally due to the "chad" or punchout. Where holes are partially punched, with what would normally be a chad remaining as a flap, or lid over the holes, the tape is "chadless." In addition, a feed hole of relatively smaller dimensions generally appears between two channels on the tape. The feed hole may be chad, chadless, pin hole, or may be lacking completely. For photoelectric sensing, coded tapes using blackened spots instead of punchouts may be used similarly. The coding scheme used may be arbitrarily chosen; for data transmission and processing the standard usage is of 5 channel and 8 channel tapes, each character being represented by a row of punch positions arranged transversely across the tape. Other uses, such as in automation control, may employ records having from 1 to 50 channels, or more. The electrical manifestations of the punch positions may be termed "bits"; the various combinations of hole and no hole bits are decoded as data. Data representations may be in various forms in addition to punched holes, such as blackened spots or other variations in the texture, electrical conductivity, or physical properties of discrete areas in the tape; to avoid confusion in understanding the invention the data representation will be referred to as either a hole or no hole. The machine system in which this invention fits will be termed a data processing system, it being understood that the term includes the range of data manipulation, including transmission, automation control, and computation.

The feedhole, or sprocket hole, where use is generally positioned on a line of centers with the data holes. In such cases, it becomes a convenient timing or positioning indicator for locating the data holes forming a particular character on the tape. Feedhole timing has become well known. It has been found, however, that sharp, precise timings required in high speed reading of paper tapes for data processing applications are not always obtainable from the leading edge of the feedhole, because of tearing occasioned by drive pins during prior handling, or, in the case of chadless feedholes, because of the interference of the lid which opens at random times. It is desired, therefore, as part of this invention, to provide means to take timings from the trailing edge of a feedhole, which is less likely to be damaged by drive pins, and occurs at a known position in chadless feedholes.

The primary utility of the invention presently appears to be in paper tape data processing systems; however, it is not so limited since application to other types of tapes or to unit records such as cards is obvious.

*Objects*

It is an object of this invention to provide relatively inexpensive electronic apparatus to read and retain data representations from an area on tape which due to inertial forces coasts past the reading station during a tape stop operation, and to transmit the data representations forward for further processing as the tape drive is restarted, which apparatus can operate effectively on several variations of records.

It is a further object of the invention to provide precise timings derived from the record medium itself regardless of the pattern of manifestations on the medium being read.

A more specific object of the invention is to provide novel means to extract master timings from the trailing edge of the feedhole in paper tapes.

Another object of the invention is to provide apparatus to generate character locationing signals for recording media where feed hole timing is not practicable, as well as to generate timings from feed holes where practicable, with a minimum of hardware and with ease in switching from one timing scheme to the other.

The foregoing and other objects, features and advantages of the invention will be apparent from the following more particular description of preferred embodiments of the invention, as illustrated in the accompanying drawings.

Figure 1:
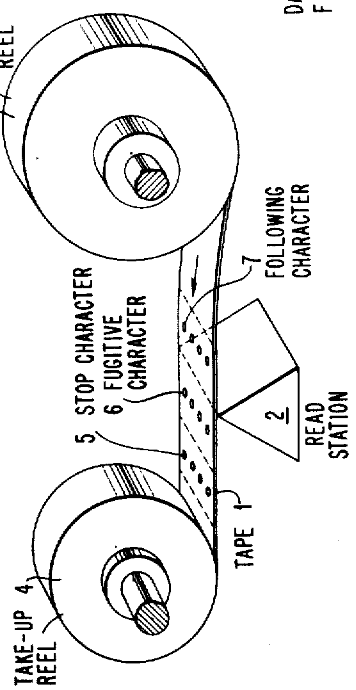
FIG. 1 is a diagram of a suitable tape drive for use with the invention.

*FIGURE 1—Tape Drive*

FIG. 1 illustrates diagrammatically the presentation of tape 1 to the read station 2, as tape is fed from supply reel 3 to takeup reel 4. The data manifestations making up a character are shown arranged transversely across the tape. It is to be understood that there is a succession of such characters, one after another, arranged serially along the length of the tape; however, to facilitate understanding of the invention, the three successive characters on the tape which are involved in the stop and start situation are designated stop character 5, fugitive character 6, and following character 7, by order of presentment to the read station 2. The leading edge and trailing edge of the data holes making up a character and the leading edge and trailing edge of the feed hole associated with a character are significant locations within each character position. There are in addition two imaginary locations for each character, which for purposes of understanding the invention are to be referred to as the read-in location and the master timing location; these two imaginary locations vary with the use of feedhole or non-feedhole timing. Stop character 5 may be a character which is decoded as a stop order, or may merely be the character which is last read when some other control means orders the tape drive to stop. Depending upon various factors such as the relative inertia of the supply and takeup reels and of tape drive elements, and the operating characteristics of the brake, the tape after a stop command may come to a stop with stop character 5 adjacent the read station 2, or may have coasted farther so that fugitive character 6 is adjacent read station 2, or may have coasted even farther so that following character 7 is adjacent to read station 2.

Record reading commences under a manual or other control signal which also starts the record drive. The record then runs past the read station at full speed, presenting the areas of the record bearing representations forming the several characters to the read station in succession for sensing, one character per character cycle, the read station producing for each character a character signal and for each data representation within the character a data signal. Each data signal has duration depending on the size of the representation and velocity of the record; the data signal conditions and associated stage of a read register. For feedhole timing, the character signal has a duration equal to the period of times at which any portion of the feedhole is in sensing position adjacent to the read station; for non-feedhole timing the character signal has a duration equal to the time in which any data representation making up the character is adjacent the read station, i.e., from the leading edge of the first representation to the trailing of the last representation. The character signal is used to signify that the record area bearing that character has arrived at the read station, and therefore is in a position to be properly read. For normal reading during character cycles not involved in the stop-start operation, the trailing edge of the character signal is the master timing location, timings being taken from the record to control processing of the data sensed upon the record. In each character cycle, at the particular time when the master timing location of the record is adjacent the read station, a master timing pulse is generated, causing read out of the content of read register to processing circuits. This readout time must be later than arrival time of the latest data representation at the read station regardless of the skew of the record, and prior to the read in time of the earliest data representation of the subsequent character.

Figure 2:
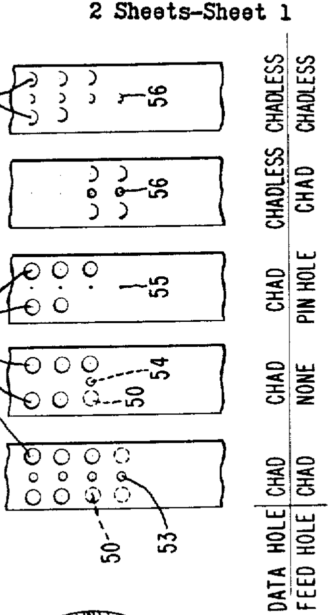
FIG. 2 is a composite drawing illustrating some of the various types of records which are compatible with the invention.

*FIG. 2—Records*

A few of the types of physical data representations are diagrammatically illustrated in FIG. 2. Only two channels, plus the feedhole channel, are shown, but it is obvious that multiple-channel recording is similarly done. The data representations shown are blank 50 (no punch), punchout 51 (chad tape) and lidded punchout 52 (chadless tape). The feedholes are punchout 53 (chad tape), blank 54 (none), pinhole 55, and lidded punchout 56 (chadless). Data representations made by other methods than punching, such as black spot data, may follow a pattern such as the chad tape-chad feedhole pattern with blanks for the blanks 50, and with black spots corresponding to the punchouts 51 and 53.

Figure 3:
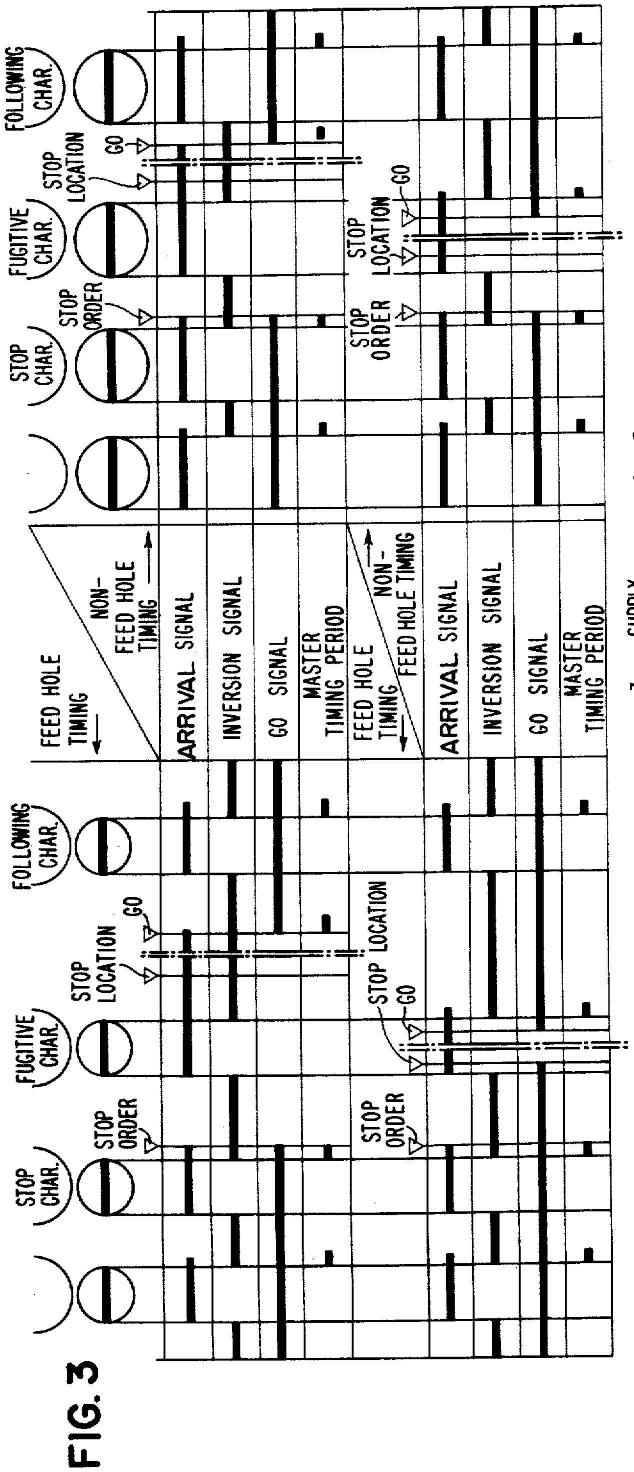
FIG. 3 is a timing diagram showing feed hole timing and non-feedhole timing, with tape stopping at two locations for each type of timing.

*FIG. 3—Timing Diagram*

The particular tape drive chosen for operation with this invention must be capable of stopping tape within the space allotted to one character, after the Stop order arrives from the start and stop control 15. Because of varying factors such as temperature, weight of the tape supply and takeup reels, and wear characteristics of various areas of the tape drive, the actual stopping location of the tape with respect to the read station will be random on any one of five areas as follows: (1) on the stop character past the master timing location; (2) between the stop character and the fugitive character; (3) on the fugitive character before the master timing location; (4) on the fugitive character past the master timing location; (5) between the fugitive character and the following character read-in location. FIG. 3, the timing chart, illustrates two such random stopping locations for feedhole timing, and two such random stopping locations for non-feedhole timing. The left side of the chart is for feedhole timing; times being taken relative to the arrival of the four characters diagrammatically illustrated at the top, three of which are labelled stop character, fugitive character, and following character. The related feed holes, since they are used for timing, are also shown. In all four situations illustrated in FIG. 3 the stop order arrives somewhat after the master timing location of the stop character.

In the situation illustrated at top left in the chart, feedhole timing, the stop location is between the data holes of the fugitive character and the data holes of the following character. The fugitive character, it is to be noted, is no longer in position to be sensed at the read station, having coasted past the read station. In the situation illustrated at lower left, feedhole timing, the stop location is at the leading edge of the feedhole of the fugitive character. In this situation the fugitive character will not yet have been read since its normal read-in location (trailing edge of feedhole) has not yet arrived at the read station. The two situations illustrate the possibility of two errors—possible loss of the fugitive character (top situation) and possible double inclusion of the fugitive character (bottom situation).

Means for avoiding these errors will be described in connection with FIG. 4, during the description of which the significance of the character signal, Arrival signal, Inversion signal and Go signal will become apparent, each having its definite role in the generation of one and only one master timing pulse for each character on tape, regardless of tape stopping and starting.

The right side of the chart is for non-feedhole timing. which is required in two tapes shown in FIG. 2 (Feedhole-None and Feedhole-Pin Hole) and may be desired in two other tapes shown in FIG. 2 (Feedhole-Chadless).

When operation is resumed after a stop, it is desired to ignore the stop character which has been read and processed under control of the master timer, to process the fugitive character, and to prevent double processing of the fugitive character. This is accomplished by taking master timing signals upon commands responsive to coincidence of three signals, each representing a condition as follows:

*Condition 1.*—Fugitive character has arrived—Arrival signal.

*Condition 2.*—Fugitive character has passed master timing location—Inversion signal.

*Condition 3.*—Start and run—Go signal.

The memory signal is on after the arrival of the leading edge of each character signal until reset as part of the gating operation; the inversion signal is on after arrival of the trailing edge of the character signal until turned off by the leading edge of the subsequent character signal. The Go signal is turned on by the machine start control and stays on until turned off by the machine stop control. Thus, during the normal running of the machine, master timings are taken from the tape for data processing. If, after a stop, the fugitive character has coasted to a stop at a location where it should have been processed except for the stop, and only in such case, a special timing pulse is generated as the Go signal comes on to process the fugitive character immediately without dependence on tape-controlled timing. On the following character, timing control returns to the tape.

Figure 4:
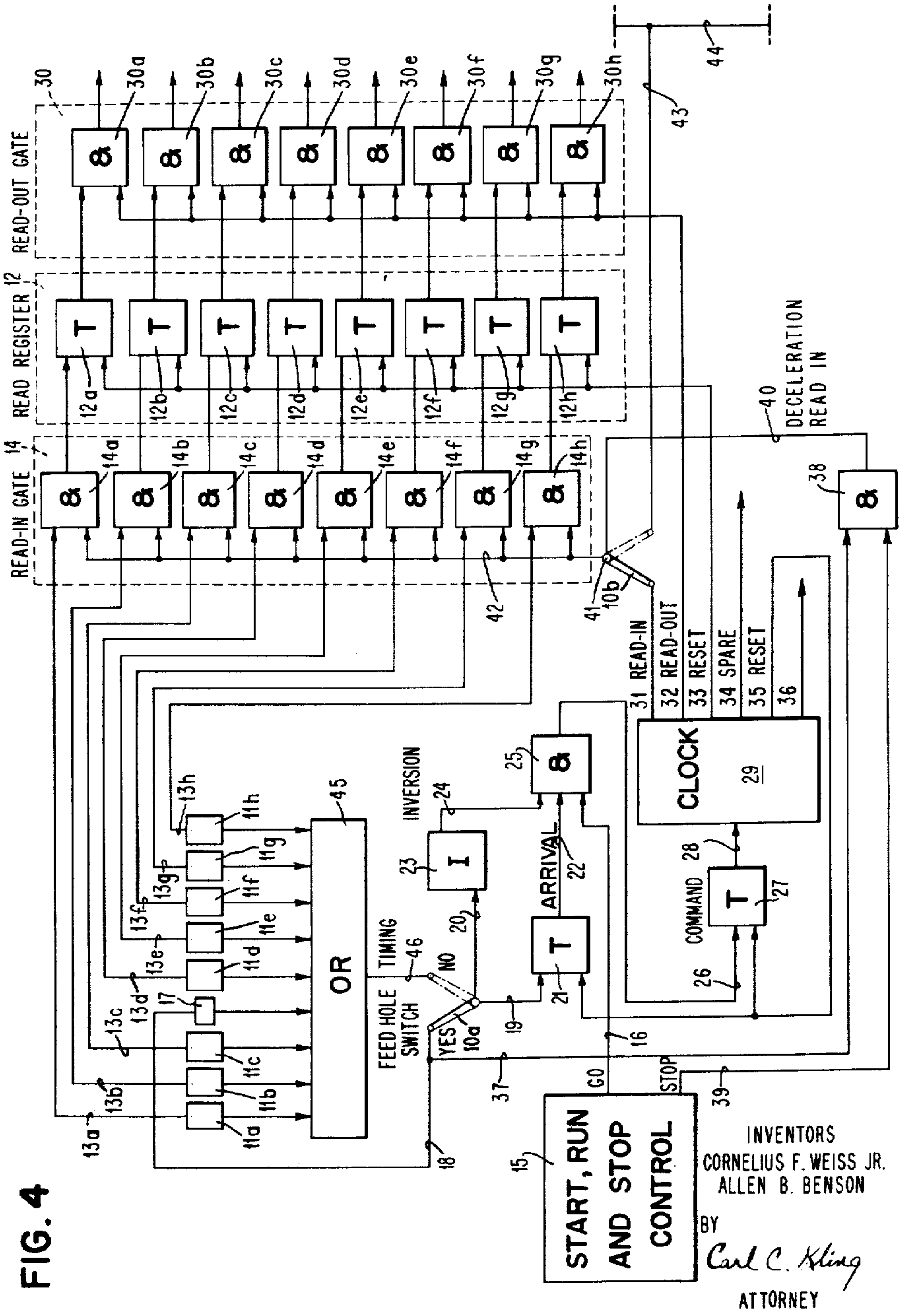
FIG. 4 is a schematic electrical diagram of the invention.

*FIG. 4—Schematic Diagram*

Sensing means 11*a*–11*h*, which may for punched tape be photocells coupled to suitable amplifiers, are arranged to sense data representations and present the data to read register stages 12*a*–12*h*, respectively, via lines 13*a*–13*h*, and read-in gates 14*a*–14*h*.

During sensing, relative movement between the record medium and the read station is assumed, under control of tape start, run, and stop control means 15 which causes the tape drive to operate and conditions the Go line 16. This start, run, and stop means may be mechanically operated switches, or preferably electronic switches operated responsive to signals from the data processing machine which accepts the data being read.

Since in modern electronic devices some voltage and current may remain on all lines continuously, the electronic state representing the operating state is herein defined to "condition" a line; the electronic state representing the non-operative state is defined to "decondition" a line. The electronic pulse appearing on a conditioned line is termed a "signal." For example, the Go signal (see FIG. 3) coincides with the time during which Go line 16 (FIG. 4) is conditioned.

*Feedhole Timing*

As the portion of the record medium bearing data representations making up a character is presented to the read station 2 (see FIG. 1) data signals are impressed on lines 13*a*–13*h* as the data representations are sensed by a sensing means 11*a*–11*h*. The feedhole is presented to the read station at a later time due to its position and smaller size. Sensing means 17 senses the feedhole and causes a character signal to be impressed on line 18 through feedhole timing switch 10*a* (Yes) onto line 19, turning arrival trigger 21 on, which conditions memory line 22. The operating time of arrival trigger 21 should be greater than that of inverter 23, since at this location of the feedhole with respect to the read station (leading edge of the feedhole has just arrived) it is not yet desired to receive a master timing command. The command depends upon coincidence of the Go signal, Arrival signal and Inversion signal, at respective inputs 16, 22 and 24 to three-input AND circuit 25. During the time that any part of the feedhole is being sensed by sensing means 17, the inversion input line 24 is deconditioned.

As the trailing edge of the feedhole passes the read station, sensing means 17 ceases to sense the feedhole, character signal path 18—10*a*—19—20 is deconditioned, and the inversion line 24 is conditioned, completing the three-way coincidence to three-input AND circuit 25. Line 26 is conditioned, turning command trigger 27 on; command line 28 is conditioned, starting clock 29, which emits a series of spaced electrical pulses 31—36 over a very short period of time, which pulses may be used to open the read-in gate 14, to reset arrival trigger 21, open the readout gate 30, and to reset the read register 12. The whole series of clock pulses preferably falls within the master timing period shown in FIG. 3. Other clock pulses may be used for other functions of the machine such as internal data transfer or conversion. The clock may be any suitable source of pulses such as an oscillator-controlled trigger counter of the type described at page 322 of Richards, Arithmetic Operations in Digital Computers, Van Nostrand, 1955. The various pulses need not necessarily be equally spaced in time, nor need all available pulses be utilized, so long as the clock emits a suitable number of distinguishable pulses within the desired short period of time following the master timing command.

There is no master timing pulse generated during the deceleration situation as the fugitive character coasts past the read station during the stop operation (see FIG. 3, top left situation) since Go line 16 is deconditioned to initiate the stop. In order to read the fugitive character into the read register 12 it is required to condition the lower inputs to AND circuits 14*a*–14*h* during the stop operation by a deceleration situation read-in pulse distinct from the read-in pulse from clock 29. Care must be taken, however, to delay the deceleration situation read-in pulse sufficiently to prevent rereading of the stop character, since certain bits of the stop character might remain adjacent the read station long enough during the deceleration period to be confused with bits of the fugitive character.

A means for providing the deceleration situation read-in pulse is line 37 which applies the character signal (feedhole timing mode) to the upper input of deceleration read-in AND circuit 38. Start, run and stop control means 15 provides the lower input to AND circuit 38 by conditioning Stop line 39, which is conditioned complementary in time with Go line 16. Deceleration situation AND circuit 38 conditions line 40, which connects through switch 106 operating arm terminal 41 to line 42, conditioning the lower inputs of AND circuits 14*a*–14*h*.

FIG. 3 shows the stop order always appearing during the master timing period (after the feedhole has passed the read station) which is the usual occurrence when the stop character is taken from the record. Other stops might appear at random times up to the master timing location of the fugitive character. In any case, deceleration read-in line 39 is deconditioned for the time interval during which the data bits of the stop character remain in reading position adjacent the read station, and conditioned for read-in only upon the next coincidence of Stop and character signals, which occurs at the leading edge of the fugitive character feedhole. The worst case stopping overthrow situation occurs when the Stop signal arrives just prior to the master timing location of the fugitive character (trailing edge of feedhole) it being necessary for the tape to stop before the character signal (leading edge of feedhole) of the following character is sensed; in other words, worst case safe stopping overthrow for random Stop signals (feedhole timing mode) is equal to the space between feedholes. Where the tape drive cannot maintain such accurate stopping, means can be simply provided to position the Stop signal in time just after the master timing period.

Where speed and circuit requirements are less exacting, the read-in gate and clock may be omitted and the readout gate operated on command of AND circuit 25.

*Non-Feedhole Timing*

For chad tape with off-center feedholes, records without feedholes, or chadless tape, it is often desirable and sometimes necessary to extract master timings from the data holes themselves. The circuit of FIG. 4, with feedhole timing switches 10*a* and 10*b* thrown to the "No" side (shown in dotted lines) is operable to read such records, take master timings from the data holes themselves, and retain the fugitive character which passes the read station during a stop.

Sensing means 11*a*–11*h* operate the respective read register stages 12*a*–12*h* directly since switch 10*b* holds the read-in gate 14 continuously open through line 43 to power line 44; OR circuit 45 is connected to sensing means 11*a*–11*h* and 17 to generate a character signal along line 46 through feedhole switch 10*a* (dotted) to turn on the arrival trigger 21 as the leading edge of the first data representation of each character is read; inverter 23 drops and holds inversion signal line 24 deconditioned until the last data representation has passed the read station.

For non-feedhole tape reading the allowable overthrow of tape is thus the tape area bounded by the master timing location (trailing edge of data holes) of the following character, a distance of approximately the length of a character and twice the space between characters.

While the invention has been particularly shown and described with reference to preferred embodiments thereof, it will be understood by those skilled in the art that various changes in form and details may be made therein without departing from the spirit and scope of the invention.

What is claimed is:

1. In apparatus for transmitting a character of data from a record, means for sensing the manifestations forming a character and emitting a feedhole signal and data signals, a character register having stages settable in response to said data signals, arrival means settable by said feedhole signal upon arrival of the character at the read station, said arrival means emitting an Arrival signal when set, and remaining set after departure of the character from said read station, normally operable inversion means rendered inoperable in response to said feedhole signal to emit an Inversion signal, control means for emitting a continuous Stop signal or a continuous Go signal, means responsive to a coincidence of the Arrival signal, Inversion signal and Go signal for producing a series of time-displaced control pulses, a read-out gate responsive to one of the series of control pulses to control the timing of read-out from said read register, deceleration situation means for producing a deceleration situation read-in signal in response to coincidence of the feedhole signal and the Stop signal, and a read-in gate to control the timing of read-in to said read register, normally responsive to one of the series of control pulses and responsive during the stop operation to the deceleration read-in signal.

2. In apparatus for reading coded data from a coded record having a sprocket designation associated with the data designations representing each character: control means to emit a Go signal; a read station having means to sense data designations and the sprocket designation; a read register; means to enter a character of data into said register from said read station; means to read out the character from said read register upon command; command means to control said readout means, said command means being operable in response to the coincident conditioning of three inputs, said inputs being—

(1) Arrival input—conditioned after arrival of the leading edge of the sprocket designation at the read station, remaining conditioned until reset, (2) Inversion input—normally conditioned but deconditioned during the sojourn of the sprocket designation at the read station, (3) Go input—conditioned for start and run of tape, deconditioned for stop, under control of said control means, whereby said command means issues a master timing command upon the passage of the trailing edge of each sprocket designation from said read station so long as said Go input is conditioned, issues no master timing command while said Go input is deconditioned during the stop, and selectively issues a special master timing command as the Go input is conditioned for a start, in case a fugitive character, defined as a character which coasted past the read station after the stop order, has caused both the memory input and inversion input to remain conditioned during the stop.

3. A circuit for producing timings from punched paper tape of varying punch configuration, comprising: means to sense the punched holes representing data; separate means to sense the feedhole; feedhole timing switch means having a "yes" and a "no" position and a common terminal, said "yes" position completing a circuit to said common terminal from said feedhole sensing means to produce a character signal at the common terminal during sensing of the feedhole, and said "no" position completing a circuit to said common terminal from said data holes sensing means in logical OR configuration to produce a character signal at the common terminal during the sensing of one or more data bits; character arrival signalling means settable by the character signal; normally operable inversion signalling means rendered inoperable by the character signal; and gating command means responsive to a coincidence of signals from said arrival signalling means and said inversion means to issue a master timing command.

4. A circuit for producing timings from punched paper tape of varying punch configuration, comprising: control means to start, run and stop the tape; means to sense the punched holes representing data, separate means to sense the feedhole; feedhole timing switch means having a yes and a no position, and a common terminal, said yes position completing a circuit to said common terminal from said feedhole sensing means to produce a character signal at the common terminal during sensing of the feedhole, and said no position completing a circuit to said common terminal from said data holes sensing means in logical OR configuration to produce a character signal at the common terminal during the sensing of one or more data holes; arrival signalling means settable by the character signal; normally operable inversion signalling means rendered inoperable by the character signal; and command means responsive to a coincidence of signals from said arrival means and said inversion means with a Go signal from said control means to issue master timing commands upon the arrival of the trailing edge of the character signal, so long as said control means presents the Go signal, to issue no master timing commands during the stop or no Go period, and selectively to issue a special master timing command as the Go signal is conditioned for a start, in case a fugitive character coasted past said read station during the deceleration of the tape for the stop.

5. In apparatus for transmitting characters of data from a punched paper tape which may be one of several types: a data photocell to sense each channel of data; a feedhole photocell to sense feedholes; a read register having a stage for each channel connected to the associated photocell; selective means to connect either a plurality of said photocells together into a group or to connect said feedhole photocell alone; an arrival trigger; an inverter; circuit means to connect said groups to said arrival trigger and inverter, to set said arrival trigger and temporarily reset said inverter during the period when said group senses a punchout; control means to cause tape feeding and emit a continuous Go signal during such feeding, and initiate a tape stop with simultaneous termination of said Go signal; command means operable in response to the set condition of said arrival trigger and of said inverter to issue a master timing command upon coincidence with the said Go signal, a clock response to the master timing command to produce a plurality of pulses spaced apart in time, and means controlled by said clock to process each character through said read register and to reset said arrival trigger.

6. In apparatus for transmitting characters of data from a record: a read station; drive means for moving the record relative to said read station; means to stop said drive means; start control means to start said drive means and issue a Go signal; character sensing means; a register responsive to said character sensing means for receiving and retaining the data portion of a character; master timing means; readout means responsive to said master timing means to read out said register; master timing command means; record location means set upon arrival at said character sensing means of the master timing location of a character, including the fugitive character, defined as that character which may pass the read station during a stop operation, and said record location means being reset under control of said master timing means, said location means presenting to said master timing command means the representation of the record-to-sensing means relationship in which the fugitive character has coasted past the read station and is in said register ready for readout under control of the master timing means; said master timing means being jointly controlled by said record location means and said Go control means to issue a special master timing command upon the arrival of the Go signal after the stop operation in which the fugitive character coasted past said read station.

7. Apparatus for transmitting characters of data from a record, having reading means for sensing the representations from a record character and for producing data signals and a character signal signifying presentment of the character to the reading means, comprising:

(*a*) a character register having stages settable in response to said data signals;

(*b*) arrival means settable by said character signal upon presentment of the character to the reading means, said arrival means emitting a continuous Arrival signal after being set, and remaining set after withdrawal of the character from said reading means;

(*c*) inversion means to invert the character signal to produce an Inversion signal complementary in time to the character signal;

(*d*) control means for emitting a Go signal; and (*e*) gating command means responsive to a coincidence of the Arrival signal, Inversion signal and Go signal for gating the character from the reading means to said character register.

8. Apparatus for processing data characters from paper tape having a feedhole for each character, serially presented to a sensing means for data holes and feedholes, the apparatus having stop and go control means and having stopping characteristics such that a fugitive character (defined as that character which is presented to and withdrawn from reading relationship to the read station during the implementation of a stop order) may develop, the apparatus comprising:

(*a*) a read register for accepting the data bits from the sensing means upon command;

(*b*) go situation command control means, responsive to the stop and go control means Go condition and to the sensing of the trailing edge of the feedhole by the sensing means, for gating the character into and out of said read register once for each presentment of a character at the read station during normal Go operation; and (*c*) stop situation control means responsive to the stop and go control means Stop condition and to the leading edge of said feedhole for gating the character from the sensing means into said read register during the deceleration period following a Stop order, during which period a "fugitive character" situation might arise;

(*d*) whereby any fugitive character which develops is stored indefinitely within said read register during the stop condition; and (*e*) whereby the fugitive character is read out at an initial stage of the succeeding go condition under control of said go situation command control means.

References Cited in the file of this patent

UNITED STATES PATENTS

| | | |
|---|---|---|
| 2,904,776 | Neff | Sept. 15, 1959 |
| 2,921,296 | Flores | Jan. 12, 1960 |
| 2,937,366 | Sims | May 17, 1960 |
| 2,954,166 | Eckdahl | Sept. 27, 1960 |